United States Patent [19]
Bogdahn

[11] Patent Number: 5,483,926
[45] Date of Patent: Jan. 16, 1996

[54] BRAKE MECHANISM FOR RETRACTABLE ANIMAL LEASH ASSEMBLY

[75] Inventor: Manfred Bogdahn, Hamburg, Germany

[73] Assignee: Bogdahn-Technik GmbH, Germany

[21] Appl. No.: 216,312

[22] Filed: Mar. 23, 1994

[30] Foreign Application Priority Data

Mar. 24, 1993 [DE] Germany .............................. 9304693 U

[51] Int. Cl.⁶ .................................................. A01K 27/00
[52] U.S. Cl. .................................................. 119/796
[58] Field of Search .................................. 119/796, 794; 242/385.3, 385.4; 42/70.06, 70.07, 70.02

[56] References Cited

U.S. PATENT DOCUMENTS

| | | | |
|---|---|---|---|
| 3,853,283 | 12/1974 | Croce et al. | 242/385.3 |
| 4,202,510 | 5/1980 | Stanish | 242/385.3 |
| 4,501,230 | 2/1985 | Talo | 119/796 |
| 4,681,020 | 7/1987 | Polanecky | 42/70.02 |
| 5,025,582 | 6/1991 | Mote, Sr. | 42/70.06 |

FOREIGN PATENT DOCUMENTS 464725  1/1992  European Pat. Off. .
1639553  4/1991  U.S.S.R. ........................ 119/796

OTHER PUBLICATIONS

"FLEXI 3–8" brochure, *FLEXI USA, Inc.*, Cincinnati, Ohio, May 1989. 8 pages.

*Primary Examiner*—Todd E. Manahan
*Attorney, Agent, or Firm*—Fay, Sharpe, Beall, Fagan, Minnich & McKee

[57] ABSTRACT

The invention relates to a retractable animal leash assembly including a housing suitable for being held in one hand, an unwindable leash arranged partially coiled within the housing, a brake which is operable by the holding hand for momentarily blocking the portion of the leash located outside the housing at a desired length and a brake lock mechanism for holding the brake in the blocking position. The brake lock mechanism is activated with operating levers arranged in two positions on the housing reachable by the holding hand. Thus the housing can be held in either the left or the right hand without degradation of function and the prolonged switch may be easily and quickly operated by the holding hand or its fingers.

17 Claims, 4 Drawing Sheets

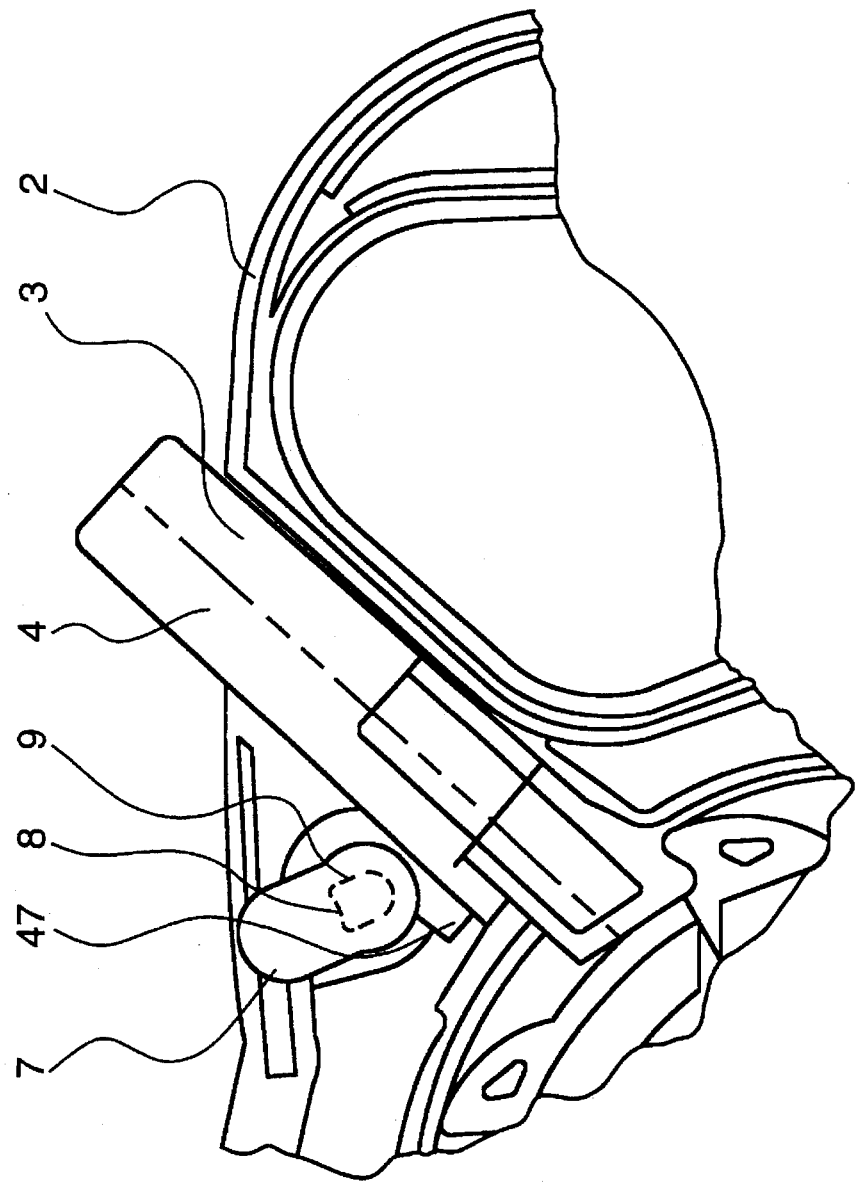

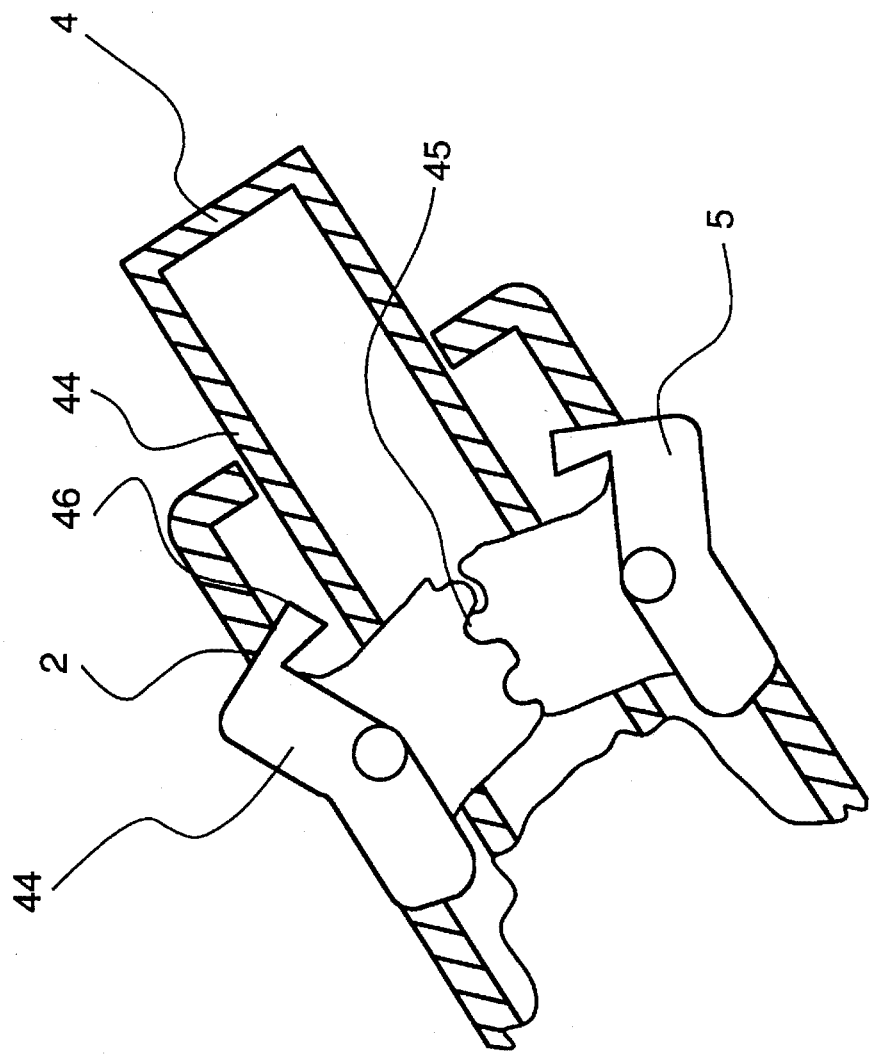

1

BRAKE MECHANISM FOR RETRACTABLE ANIMAL LEASH ASSEMBLY

BACKGROUND OF THE INVENTION

1. Field of the Invention

The invention concerns a portable, retractable animal leash assembly, wherein said leash line is arranged on a wind-up spool mounted to rotate in a housing carried in the hand. The assembly includes a brake having brake activation means operable by the carrying hand to stop the portion of said leash line wound off the spool located outside the housing at a desired lenght and a brake lock mechanism being associated with the leash in the region of the brake to lock the leash in the position momentarily determined by the brake. The brake lock mechanism includes operating means separated from said brake activation means.

2. Prior Art

In leash assemblies of similar construction known in the art the brake lock mechanism sits directly in or by a brake activation device. This arrangement is very user friendly particularly with regard to its handling. However, due to the combination of break and brake lock in one switch, erroneous switching cannot be avoided with certainty. This is particularly true when the animals on the leash, in general dogs, react unexpectedly and suddenly to influences in their surroundings so that the user of the leash, often for this reason alone, loses track of what is happening and as a result is unable to operate the lead with the required safety.

In order to achieve a greater degree of safety in use, leash assemblies have become known in which the brake activation mechanism is arranged separately on the housing from the operating means for the brake lock mechanism. To this end, the brake lock mechanism is formed as a slidable pin whose ends project out of the housing, whereby one pin end functions as an operating means to lock the brake and extends from one side of the housing while the other pin end is arranged to extend from the other side of the housing to release the brake. The pin further comprises means which achieve the brake lock function by positively locking the activated brake. A disadvantage of such leash assemblies is that the brake lock function can only be attained by acting on the corresponding pin end of the lock mechanism either solely with the left hand or solely with the right hand, depending on the form of the leash assembly or its housing. The same is true for releasing the brake lock function. It is thus conceivable that in practice the user of such a leash assembly holds the same with the left hand, although the operating means for achieving the brake lock function are arranged in such a way that they can only safely and rapidly be accessed by the holding hand when the leash assembly is held in the right hand. Of course, the reverse situation is also possible. In practice, however, it is not always feasible to hold or operate the leash assembly only with the hand for which it is specified, so that in an emergency it has possibly first to be transferred to the other hand, thus unnecessarily losing time.

OBJECTS OF THE INVENTION

It is the main object of the invention to suggest a leash assembly which overcomes the above described drawbacks of the prior art devices and may be held in either hand as desired without degradation of function.

A further object of the invention is to provide a leash assembly in which the brake lock mechanism operating means can be easily and quickly reached by the holding hand or its fingers.

SUMMARY OF THE INVENTION

In a portable and retractable animal leash assembly, wherein a leash is arranged on a wind-up spool mounted to rotate in a housing carried in the hand and said assembly includes a brake having brake activation means operable by the carrying hand to stop the portion of said leash wound off the spool and located outside the housing at a desired length, as well as a brake lock mechanism associated with said assembly in the region of the brake to lock the leash in the position momentarily determined by said brake, the brake lock mechanism includes means for operating the same separated from said brake activation means. These and further objects are achieved in that the means for operating the brake lock mechanism includes at least two operating means arranged in at least two positions on the housing which can be reached by the carrying hand such that the desired brake lock function is achievable by selectively activating one of the two operating means. In this way there is provided an animal leash assembly, which while achieving the above objects can, when necessary, allow a rapid and safe reaction to particular unexpected or sudden movements of the animal on the leash due to the ergonomic arrangement of its operating means. In other words, rapid operation of the brake lock mechanism by the holding hand is always possible.

The operation means can advantageously be formed as pivot levers, arranged opposite one another and operatively connected to one another through a shaft which passes through the housing. Pivot levers of this type are particularly simple to operate, cheap to produce and easy to integrate into an animal leash assembly housing. A further particularly advantageous feature of these levers is their robustness in all possible situations.

A particularly secure brake lock function can be achieved by forming the shaft such that it is operatively connected to the brake, whereby after activation of the brake, the same is positively locked by the shaft; after corresponding operation of one of the pivot levers. In this way, a stable locking of the brake may be obtained. This can be particularly rapidly achieved by effecting the positive locking of the brake and shaft by a pivotal or rotational movement of the shaft, to which end a recess provided ill the shaft for allowing the passage of a peg on the brake moves out of reach of the peg, and the outer circumference of the shaft locks the peg and thereby also the brake.

In order to obtain a brake lock mechanism that allows easy production and assembly, one of the pivot levers may be formed as an integral part of the shaft, i.e. the pivot lever and shaft forming one unit, while the other pivot lever can be connected to the free end of the shaft. This connection between the shaft and the free lever can advantageously be formed as a snap-together connection.

In order to prevent an unintentional locking of the brake, the shaft can include a spring element, which holds the brake lock mechanism in the respective rest position inside the housing so that the pivoting or rotation of the shaft can only occur by the conscious operation of one of the pivot levers.

In a further advantageous embodiment of the brake lock mechanism, the operation means can be formed as tilt or flip switches, whereby the brake is locked by the positive engagement of protruding elements of such switches in recesses provided on the brake. The tilt switches can be operatively connected by means of positively engagable interlocking elements, preferably cog wheel segments.

BRIEF DESCRIPTION OF THE DRAWINGS

These and other objects of the present invention will be apparent from the following description and claims and are illustrated in the accompanying drawings which, by way of illustration, schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings:

FIG. 3 shows a fragmentary sectional representation of the animal leash assembly of FIG. 1 illustrating the principle underlying the cooperation between the brake lock mechanism operating means and the brake;

FIG. 4 shows a modified version of a brake lock mechanism.

Figure 1:
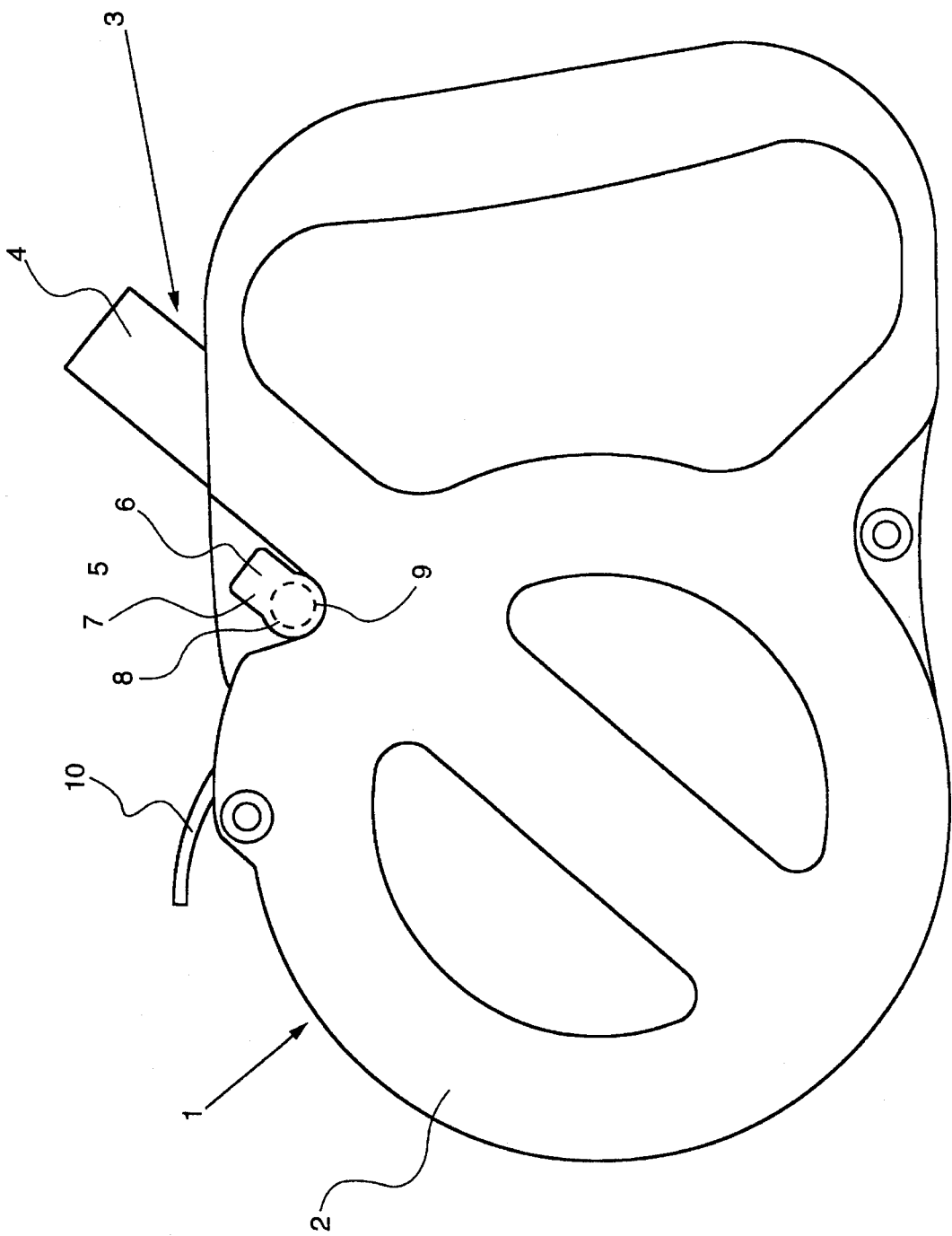
FIG. 1 shows a side view of an animal leash assembly according to the present invention.

An animal leash assembly 1 shown in FIG. 1 comprises a housing 2, in which is stored an unwindable and rewindable leash or line 10, wound around a not shown spool arrangement. A free end of said leash 10 extending outside the housing may be attached to the animal. A brake 3 is operatively connected with the spool and includes an activating mechanism 4 which projects outside the housing 2. The construction and function of the animal leash assembly 1 with the housing 2 and brake 3 are well known in the art and need not be described in greater detail in the context of the present invention.

In the immediate area of operation of the brake 3 there is arranged a brake lock mechanism 5, which, after activation of the brake activating mechanism 4 to stop the unwinding of the leash 10, can be operated to arrest the run of the leash and thus obtain a free leash end of a desired length for freely determinable length of time. The brake lock mechanism 5 according to the invention includes means 6 for its operation arranged on both sides of the housing 2. A shaft 8 extending through the housing 2 is operatively connected to pivot levers 7 provided at its ends which function as operating means. The brake lock mechanism 5 can be actuated by means of the pivot lever 7 with a finger of the hand holding the housing 2. It is irrelevant whether the housing 2 is held in the left or the right hand, since the pivot levers 7 are arranged on both sides of the housing 2.

Figure 2A:
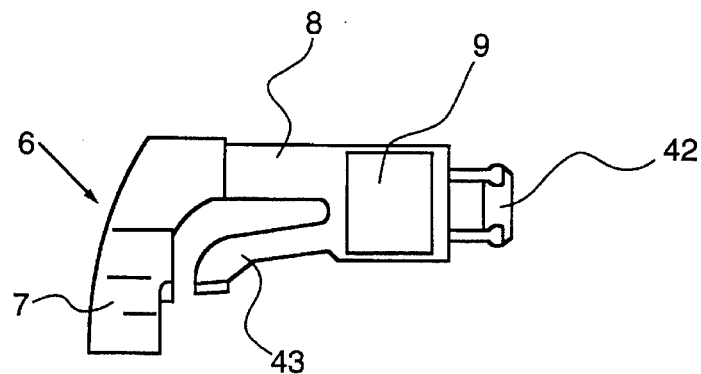
FIGS. 2a) to 2c) shows three different views of the components of a pivot lever and shaft for the animal leash assembly of FIG. 1.
Figure 2B:
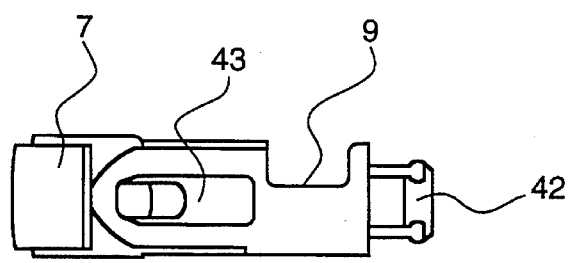
Figure 2C:
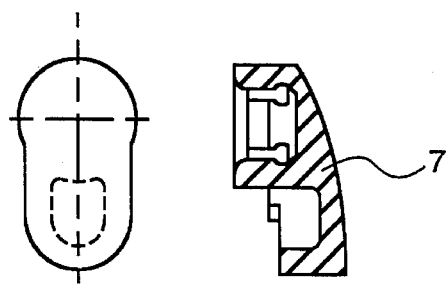

The brake lock mechanism 5 according to FIGS. 2a) and 2b) comprises a shaft 8 with which a pivot lever 7 is integrally formed. The other free end of the shaft 8 comprises a peg or tappet 12 with which the second pivot lever 7 shown in FIG. 2c) can be catch mounted onto the shaft 8. A recess 9 is provided in the shaft 8 which, when said shaft 8 assumes the position shown in FIG. 1, allows the free passage of a peg 17 provided on the brake activation means 4. Thus when the brake 3 is operated to move out of a non-braking position, the peg 17 is able to virtually slide through the shaft 8 to arrive at the blocking position shown in FIG. 3, in which position the inner end of the activating means 4 engages in a known manner with a projection on the partially shown leash winding spool and locks the same. When it is desired to hold the leash 10 in the extended position not just momentarily but to achieve a sustained function of the brake 3, one of the pivot levers 7 is moved, the other lever thereby necessarily moving as well, into the position shown in FIG. 3. In this way, the outer surface of the shaft 8 rotates into the region of the peg 17 and locks the the brake 3 in its blocking position. If one of the pivot levers 7, and thus the other necessarily also, is moved back into its original position, the recess moves back into the vicinity of the peg 17 and a spring (not shown) pushes the brake 3 together with its activating mechanism 4 back into its original position where it extends further out of the housing 2. The arrangement of such a spring is also generally known in the art and thus need not be described in greater detail here.

In addition, there is provided a spring element 13 arranged on the shaft 8 which, when said shaft 8 is in a position in which the leash 10 is released as shown in FIG. 1, is engaged in a recess (not shown) of the housing 2. Thus when the pivot lever 7 is not operated, it is always held in the position allowing free movement of the brake 3.

The advantage of the brake lock mechanism according to the invention lies in the ease of handling, irrespective of whether the housing 2 is held in the left or right hand. In this way, the occurrence of erroneous switching as a result of confusion on the part of the user, due for example to a sudden action by the animal on the leash, is impossible.

FIG. 4 shows a modified embodiment of a brake lock mechanism 5 according to the invention. In this embodiment, the brake lock mechanism 5 comprises two tilt or flip switches 14 pivotable relative to one another, which engage with each other through cogwheel segments 15, such that on operating one of these tilt switches 14, the other is constrained to move as well. Hook-like elements 16 are provided on the tilt switches 14, which, on operation of the latter, positively engage with recesses 11 in the brake activation means 4 and thereby lock the brake 3.

I claim:

1. A retractable animal leash assembly, comprising a housing which is carried in a hand and a leash arranged in said housing and having a free end portion which extends out of said housing, said leash assembly further comprising brake means including brake activation means, said brake means being operable by said carrying hand into an activated position to hold said portion of said leash located outside said housing at a desired length, and a brake lock mechanism for providing a sustained brake function, said brake lock mechanism being associated with said assembly in a region of said brake means to lock the leash in the position momentarily determined by said brake means, said brake lock mechanism comprising means for operating said brake lock mechanism separated from said brake activation means, wherein said means for operating said brake lock mechanism comprise at least two operating means each arranged in different positions on said housing which can be reached by said carrying hand, such that a desired brake lock function is achievable by selectively activating one of said two operating means.

2. A retractable animal leash assembly as claimed in claim 1, further comprising a shaft extending through said housing, said operating means being formed as pivot levers arranged opposite one another and operatively connected to one another by means of said shaft.

3. A retractable animal leash assembly as claimed in claim 2, wherein said shaft is operatively associated with said brake means, said brake means being positively lockable in its said activated position by said shaft on corresponding operation of one of said pivot levers.

4. A retractable animal leash assembly as claimed in claim 3, wherein a recess is provided in said shaft and a peg-shaped means is provided on said brake means, said recess being formed to allow passage of said peg-shaped means, said brake means and said shaft being positively locked together on rotating said shaft such that said recess moves away from said peg-shaped means and said peg-shaped means is blocked by said shaft.

5. A retractable animal leash assembly as claimed in claim 4, wherein one of said pivot levers is formed as an integral part of said shaft, provided at one end of the same, the other of said pivot levers being formed as a separate component connectable to a free end of said shaft.

6. A retractable animal leash assembly as claimed in claim 5, wherein said free end of said shaft and said other pivot lever are arranged to be attached to one another by means of a snap-together connection.

7. A retractable animal leash assembly as claimed in claim 4, wherein said brake lock mechanism is arranged to assume an activated position and a deactivated position, whereby in its said activated position it provides a sustained brake function, said shaft comprising a spring element which holds said brake lock mechanism in its respective position.

8. A retractable animal leash assembly as claimed in claim 3, wherein one of said pivot levers is formed as an integral part of said shaft, provided at one end of the same, the other of said pivot levers being formed as a separate component connectable to a free end of said shaft.

9. A retractable animal leash assembly as claimed in claim 8, wherein said free end of said shaft and said other pivot lever are arranged to be attached to one another by means of a snap-together connection.

10. A retractable animal leash assembly as claimed in claim 3, wherein said brake lock mechanism is arranged to assume an activated position and a deactivated position, whereby in its said activated position it provides a sustained brake function, said shaft comprising a spring element which holds said brake lock mechanism in its respective position.

11. A retractable animal leash assembly as claimed in claim 2, wherein one of said pivot levers is integrally formed at one end of said shaft, the other of said pivot levers being formed as a separate component connectable to a free end of said shaft.

12. A retractable animal leash assembly as claimed in claim 11, wherein said free end of said shaft and said other pivot lever are arranged to be attached to one another by means of a snap-together connection.

13. A retractable animal leash assembly as claimed in claim 12, wherein said brake lock mechanism is arranged to assume an activated position and a deactivated position, whereby in its said activated position it provides a sustained brake function, said shaft comprising a spring element which holds said brake lock mechanism in its respective position.

14. A retractable animal leash assembly as claimed in claim 11, wherein said brake lock mechanism is arranged to assume an activated position and a deactivated position, whereby in its said activated position it provides a sustained brake function, said shaft comprising a spring element which holds said brake lock mechanism in its respective position.

15. A retractable animal leash assembly as claimed in claim 2, wherein said brake lock mechanism is arranged to assume an activated position and a deactivated position, whereby in its said activated position it provides a sustained brake function, said shaft comprising a spring element which holds said brake lock mechanism in its respective position.

16. A retractable animal leash assembly as claimed in claim 1, wherein said operating means are formed as tilt switch means comprising protruding elements and said brake activation means comprise recesses for accomodating said protruding elements, such that the positive engagement of said protruding elements in said recesses results in the locking of said brake.

17. A retractable animal leash as claimed in claim 16, wherein said tilt switch means are operatively connected with one another by means of positively interlocking elements.

* * * * *